US012784243B2

(12) United States Patent
Pan et al.

(10) Patent No.: US 12,784,243 B2
(45) Date of Patent: Nov. 3, 2026

(54) METHOD FOR BINOCULAR DEPTH ESTIMATION, EMBEDDED DEVICE, AND READABLE STORAGE MEDIUM

(71) Applicant: UBTECH ROBOTICS CORP LTD, Shenzhen (CN)

(72) Inventors: Baiyu Pan, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 359 days.

(21) Appl. No.: 18/603,100

(22) Filed: Mar. 12, 2024

(65) Prior Publication Data

US 2024/0331173 A1 Oct. 3, 2024

(30) Foreign Application Priority Data

Mar. 30, 2023 (CN) ......................... 202310366088.8

(51) Int. Cl.
*G06T 7/50* (2017.01)
*G06V 10/77* (2022.01)
*G06V 10/82* (2022.01)

(52) U.S. Cl.
CPC ............ *G06T 7/50* (2017.01); *G06V 10/7715* (2022.01); *G06V 10/82* (2022.01); *G06T 2207/20228* (2013.01)

(58) Field of Classification Search
USPC .......................................... 382/100, 154–156
See application file for complete search history.

(56) References Cited

U.S. PATENT DOCUMENTS 10,503,966 B1 * 12/2019 Pan ......................... G06T 7/593
11,100,401 B2 * 8/2021 Godard ...................... G06T 7/50
11,450,017 B1 * 9/2022 Fang ........................ G06T 7/557
11,861,859 B2 * 1/2024 El-Khamy .............. G06T 7/593
2019/0301861 A1 * 10/2019 Wang ....................... G01C 3/14
(Continued)

FOREIGN PATENT DOCUMENTS

CN 110009691 A * 7/2019 ............... G06T 7/85
CN 114387325 A * 4/2022 ............. G06N 3/045

OTHER PUBLICATIONS

Wang et al., Deep Convolutional Network for Stereo Depth Mapping in Binocular Endoscopy, IEEE Access, Digital Object identifier 10.1109/ACCESS.2020.2987767, pp. 73241-73249 . (Year: 2020).*
(Continued)

*Primary Examiner* — Ishrat I Sherali

(57) ABSTRACT

A method for binocular depth estimation is provided, including: obtaining binocular images and performing feature extraction on the binocular images to obtain left and right feature mappings; performing disparity construction by using the left and right feature mappings to obtain a disparity cost volume with a reduced dimension; performing attention feature learning on the disparity cost volume to obtain an attention feature vector and performing feature weighting on the disparity cost volume by using the attention feature vector to obtain a weighted cost volume; performing disparity regression on the weighted cost volume based on a two-dimensional convolution to obtain a prediction disparity map; and performing disparity depth conversion on the prediction disparity map to obtain a depth map of the binocular images.

13 Claims, 6 Drawing Sheets

(56) References Cited

U.S. PATENT DOCUMENTS

| | | | | |
|---|---|---|---|---|
| 2021/0241479 | A1* | 8/2021 | Jie | G06N 3/0464 |
| 2022/0230343 | A1* | 7/2022 | Ye | G06T 7/593 |
| 2023/0386063 | A1* | 11/2023 | Yang | G06T 7/593 |

OTHER PUBLICATIONS

Du et al., Improved Disparity Estimation Based on PSMNet, IEEE 2021, 978-1-6654-4089-9/21, pp. 1157-1163. (Year: 2021).*

Wanali et al., An Approach for Stereo Matching Using Pair-wise Sequence Alignment Algorithm Based on Dynamic Programming, 2010IEEE, 978-0-7695-3972-0/10, pp. 511-514 (Year: 2010).*

"Research on stereo matching algorithm based on deep learning", Zhang Shachua, China Excellent Master's Thesis Full-text Database, Issue 01, pp. 45-58.

* cited by examiner

METHOD FOR BINOCULAR DEPTH ESTIMATION, EMBEDDED DEVICE, AND READABLE STORAGE MEDIUM

CROSS REFERENCE TO RELATED APPLICATIONS

The present disclosure claims the benefit of priority under the Paris Convention to Chinese Patent Application No. 202310366088.8 filed on Mar. 30, 2023, which is incorporated herein by reference in its entirety.

TECHNICAL FIELD

The present disclosure relates to the technical field of image processing, and in particular to a method and apparatus for binocular depth estimation, an embedded device, and a readable storage medium.

BACKGROUND

Binocular depth estimation refers to searching for matched pixel points on obtained left and right view images, calculating a corresponding disparity, and then calculating a real physical distance (i.e., depth information) in combination with known binocular camera information. Conventional binocular depth estimation algorithms are mostly local or global search algorithms, i.e., a matching degree of pixels on left and right view images are calculated by constructing a cost function, and pixels with the minimum cost are selected within a search range as matching points.

However, some problems are found in these conventional algorithms in practical application, for example, a five-dimensional disparity cost space is constructed in a conventional method, so that a large amount of three-dimensional convolution is required to generate depth estimation, thereby having problems of large occupied memory and large calculation amount, especially for embedded devices with low computing power in which the conventional method cannot be applied and depth estimation cannot be carried out in real time. In addition, problems of low precision and the like are likely to occur due to too many matching candidates.

BRIEF DESCRIPTION OF DRAWINGS

In order to describe the technical schemes in the embodiments of the present disclosure more clearly, the following briefly introduces the accompanying drawings required for describing the embodiments. It should be understood that the accompanying drawings in the following description merely show some embodiments and should not be considered as limiting the scope. For those skilled in the art, other drawings can be obtained according to the drawings without creative efforts.

DETAILED DESCRIPTION

Figure 1:
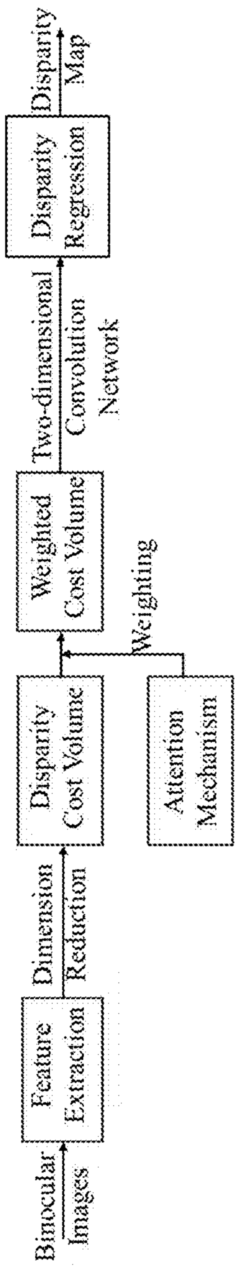
FIG. 1 is a main architecture diagram of a method for binocular depth estimation according to an embodiment of the present disclosure.

The technical solutions in the embodiments of the present disclosure will be clearly and completely described below with reference to the accompanying drawings in the embodiments of the present disclosure.

Components in the embodiments of the present disclosure, which are generally described and illustrated herein, may be arranged and designed in a variety of different configurations. Therefore, the following detailed description of the embodiments of the present disclosure provided in the accompanying drawings is not intended to limit the scope of the claimed present disclosure, but merely represents a selected embodiment of the present disclosure. Based on the embodiments of the present disclosure, all other embodiments obtained by a person skilled in the art without creative efforts shall fall within the protection scope of the present disclosure.

In the following, the terms 'comprising,' 'including,' 'having,' and their cognates, as used in various embodiments of the present disclosure, are intended to express inclusion of specific features, numbers, steps, operations, elements, components, or combinations thereof. They should not be construed to exclude the presence of one or more other features, numbers, steps, operations, elements, components, or combinations thereof, or exclude the possibility of adding one or more features, numbers, steps, operations, elements, components, or combinations thereof. Additionally, terms such as 'first,' 'second,' 'third,' etc., are used for descriptive purposes only and should not be interpreted as indicating or implying relative importance.

Unless otherwise defined, all terms (including technical and scientific terms) used herein have the same meaning as commonly understood by one of ordinary skill in the art to which various embodiments of the present disclosure belong. The terms, such as terms defined in commonly used dictionaries, will be interpreted as having the same meaning as the context meaning in the relevant technical field and will not be construed as having an idealized meaning or overly formal meaning unless expressly defined in the various embodiments of the present disclosure.

Some embodiments of the present disclosure are described in detail below with reference to the accompanying drawings. In the case of no conflict, the following embodiments and features in the embodiments may be combined with each other.

Disparity is a position difference between corresponding pixel points on left and right images in a horizontal direction, and a target of binocular depth information estimation is to calculate disparity of each pixel point on a reference image, so that precision of a depth is improved along with precision of disparity prediction. Generally, conventional binocular depth estimation mainly includes the following four steps: matching cost calculation, cost aggregation, disparity calculation and disparity optimization. However, in existing solutions, a disparity cost volume with a total dimension of 5 dimensions is usually constructed for the matching cost calculation, and it is described as a cost space with a total dimension of [B, C, D, H, W], where B represents Batch, C represents Channel, D represents Disparity, H represents Height, and W represents Width. It should be understood that the larger the total dimension is, the more the memory occupied by the disparity cost space is, the more complex the subsequent processing steps of cost aggregation, disparity calculation and disparity optimization are, and the larger the corresponding calculation amount is. Therefore, for an embedded device, since the computing power is insufficient and the memory is limited, the above conventional method cannot be implemented on the embedded device, which causes the binocular depth estimation to be restricted on such devices.

Based on this, the present disclosure provides a lightweight method for binocular depth estimation. After feature extraction is performed on binocular images, as shown in FIG. 1, dimension reduction is adopted in construction of a disparity cost volume. Meanwhile, in order to ensure the precision after the dimension reduction, an attention mechanism is combined to use an additional supervision signal to weight a disparity feature. In addition, only a two-dimensional convolution model needs to be used to achieve disparity prediction in the process of disparity regression. Meanwhile, due to the fact that complexity of the model is reduced, the embedded device can adopt a format supported by the embedded device to perform format conversion on a constructed model file, so as to transfer the model file to the device for use. According to the method, real-time computing can be realized on an embedded platform with low computing power, and the problem that an existing method cannot be carried out in the embedded device is effectively solved.

The method for binocular depth estimation is described below in combination with some specific embodiments.

Figure 2:
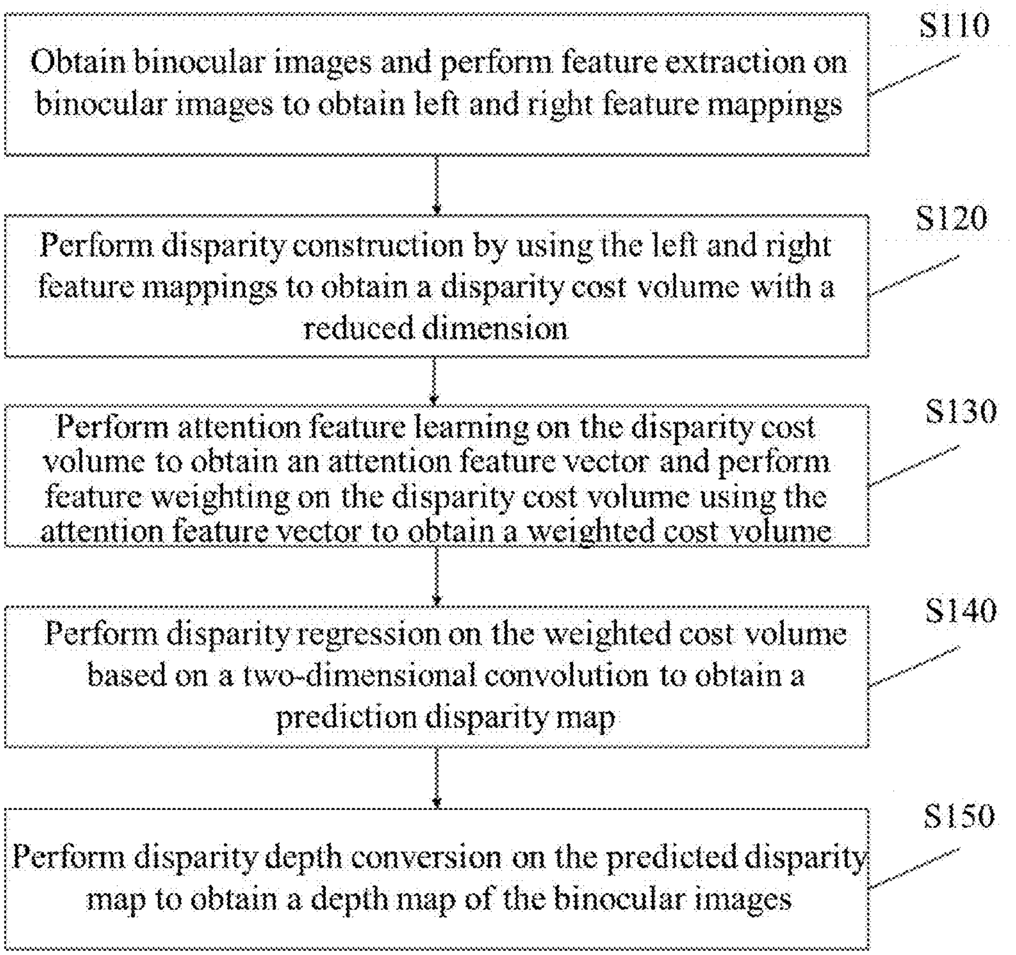
FIG. 2 is a flowchart of a method for binocular depth estimation according to an embodiment of the present disclosure.

FIG. 2 is a flowchart of a method for binocular depth estimation according to an embodiment of the present disclosure. As an example, the method for binocular depth estimation is mainly applied at an embedded device, that is, the embedded device is configured to execute the following operations.

S110, obtaining binocular images and performing feature extraction on the binocular images to obtain left and right feature mappings.

As an example, a binocular camera is installed on the embedded device for obtaining binocular images (also referred to as left and right images or left and right eye images) in real time, and then feature extraction is performed based on the obtained binocular images, so as to obtain respective feature mappings of the left image and the right image. A pre-trained neural network may be used to perform the feature extraction, and a specific structure is not limited herein, for example, some lightweight neural networks such as MobileNet series may be preferentially used as a feature extraction model.

If the feature extraction and depth estimation are directly performed by using original binocular images that are obtained, the matching efficiency is greatly reduced when the pixels are matched. Because there is no prior constraint between the binocular images, and for each pixel of the left image, a matched pixel needs to be searched in full-image space of the right image. Thus, the binocular images are preprocessed in the embodiments before the feature extraction is performed, so as to greatly improve the efficiency of subsequent disparity calculation.

In some embodiments, before performing feature extraction on the binocular images, the method further includes preprocessing the obtained binocular images. It should be understood that the preprocessed binocular images are used for subsequent feature extraction. The preprocessing may include, but is not limited to, performing epipolar alignment on the original binocular images that are obtained, and performing pixel normalization processing on the aligned binocular images.

Figure 3:
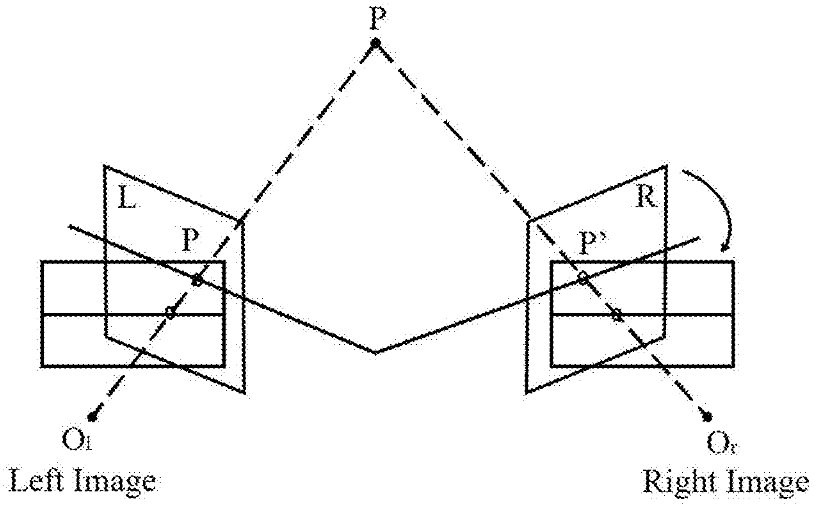
FIG. 3 is an epipolar constraint schematic diagram of a method for binocular depth estimation according to an embodiment of the present disclosure.
Figure 4:
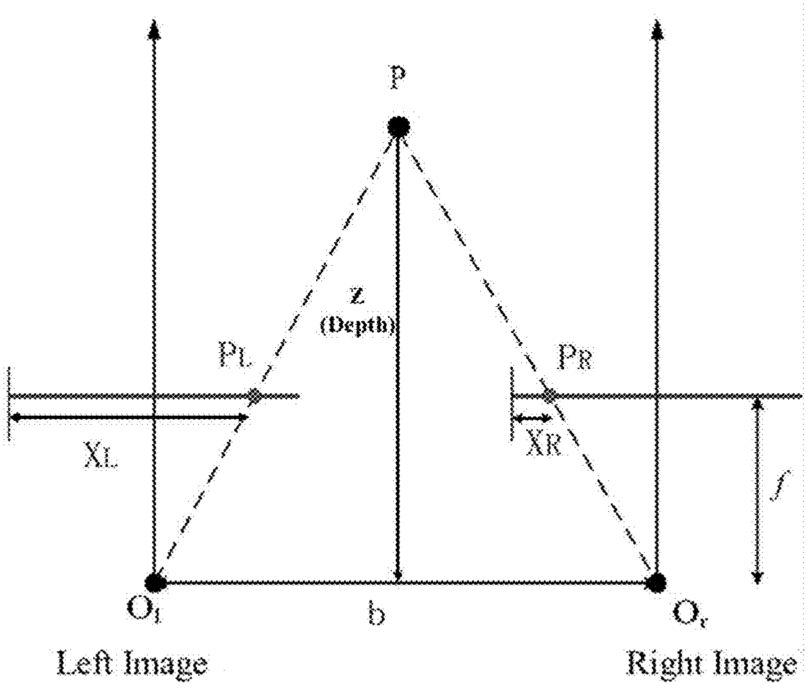
FIG. 4 is an epipolar alignment schematic diagram of a method for binocular depth estimation according to an embodiment of the present disclosure.

As an example, when performing the epipolar alignment, as shown in FIG. 3, the images may be projected onto a plane parallel to a baseline by means of calibrated external parameters and baseline distances of cameras, main optical axes of the two cameras are parallel to each other, so that intersection lines of a polar plane and the binocular images are located in the same scanning row. In this way, the same epipolar corresponds to the same row of the left and right images, that is, row numbers of homonymous point pairs must be the same, and only column numbers are different, thereby completing the epipolar alignment. Therefore, only the difference (i.e., the disparity) of the column numbers exists at the homonymous points in the left and right images after the epipolar alignment, so that objects in the binocular images can be ensured to be on the same horizontal line. It should be understood that after the epipolar alignment, an X axis of a camera coordinate system is parallel to the baseline, and a Z axis is perpendicular to an image plane, as shown in FIG. 4. It is seen that if the disparity is obtained, the required depth information can be calculated according to the following formula by using a triangle similarity principle.

In addition, after the epipolar alignment is performed, pixel normalization processing is also performed on the binocular images for facilitating the extraction of image features. Specifically, pixel distribution of the left and right images is normalized from original 0-255 to 0-1, a mean value of the RGB channel is subtracted from each value in the RGB channel image, and then the result is divided by a standard deviation of the channel, thereby obtaining standardized binocular images. Finally, the standardized binocular images are respectively input into the feature extraction model to obtain the left and right feature mappings.

S120, performing disparity construction by using the left and right feature mappings to obtain a disparity cost volume with a reduced dimension.

The cost volume is used to measure similarity of two image blocks in the left and right binocular images in binocular matching, so as to determine whether the two image blocks match. It should be noted that, different from a conventional cost volume construction mode, when constructing the disparity cost volume in the embodiments of the present disclosure, the dimension reduction on the channel dimension is realized by multiplying a multi-layer convolution and a feature mapping, and then a cyclic plus append mode is provided based on the dimension reduction, that is, new space is continuously added only in the disparity dimension to obtain the disparity cost volume with the total dimension of 4 dimensions. Since an append operation on a single dimension can be supported by the current embedded device, it is convenient to implement on an embedded platform.

As an example, the dimension reduction is implemented in a combination manner of a multi-layer convolution structure and group-wise correlation calculation, so as to construct a cost space with a channel number of 1 (C=1) to reduce memory occupation to 1/C. In addition, a two-dimensional convolution can be used to perform calculation in a subsequent disparity regression process, a calculation amount thereof is reduced to ⅓ of a conventional solution using a three-dimensional convolution. This solution is convenient to be transferred to an embedded device with a lower computing power.

Figure 5:
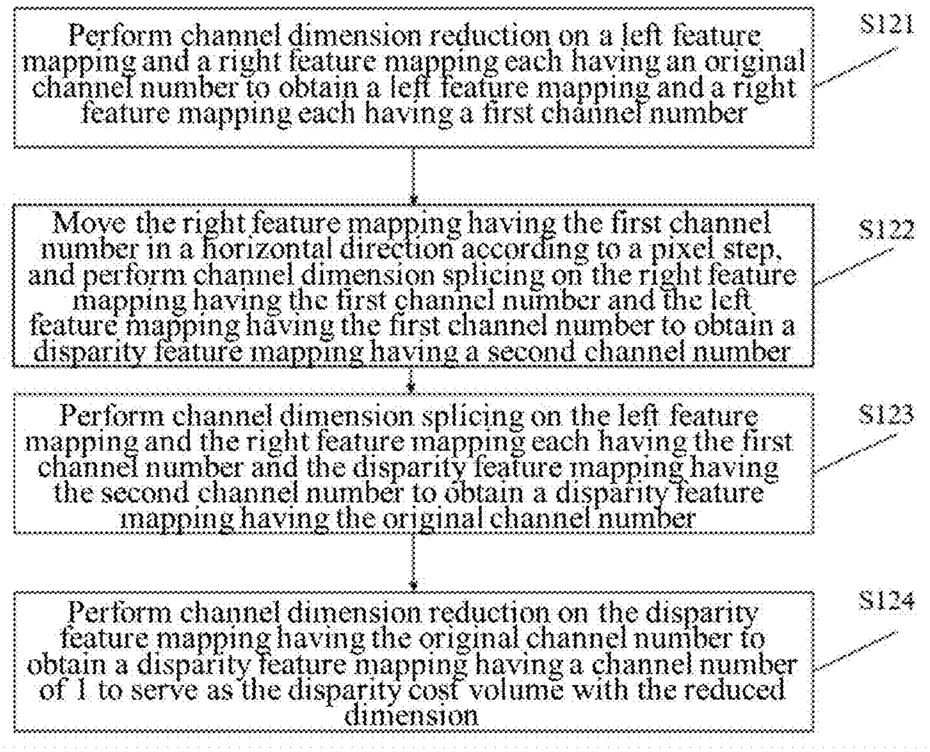
FIG. 5 is a flowchart of constructing a disparity cost volume of a method for binocular depth estimation according to an embodiment of the present disclosure.
Figure 6:
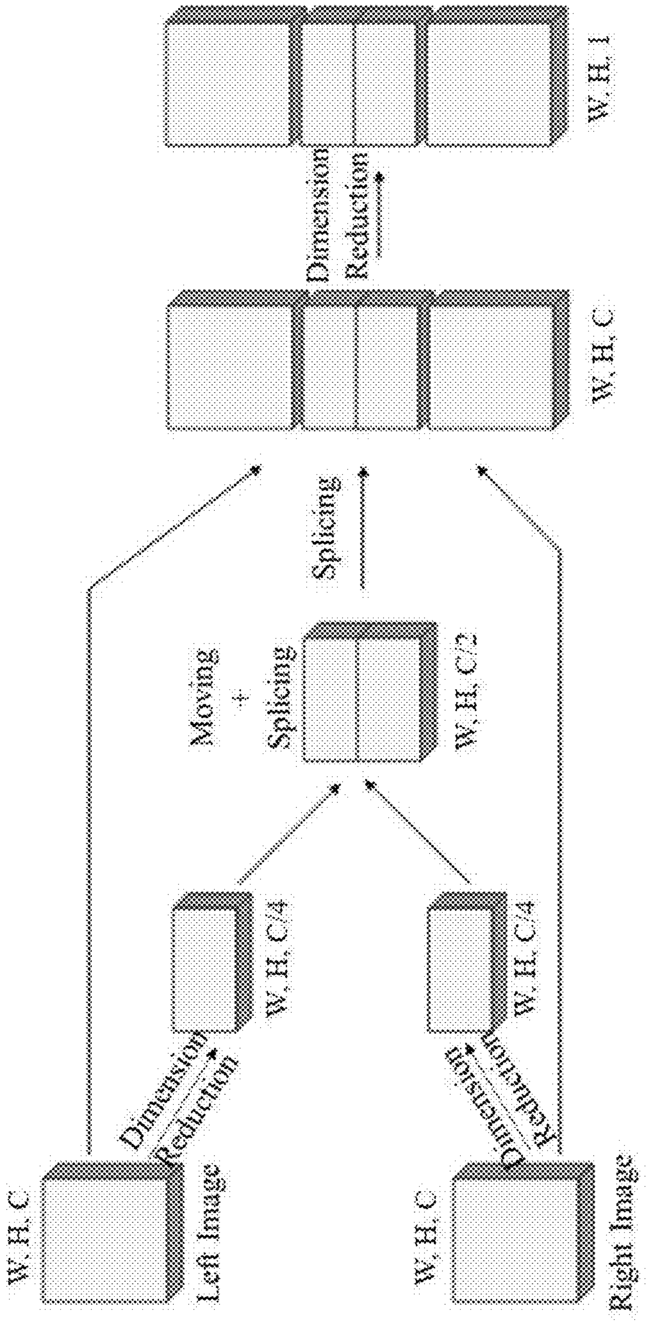
FIG. 6 is a schematic diagram of constructing a cost volume with dimension reduction of a method for binocular depth estimation according to an embodiment of the present disclosure.

In one embodiment, as shown in FIG. 5 and FIG. 6, operation S120 includes the following sub-operations.

S121, performing channel dimension reduction on a left feature mapping and a right feature mapping each having an original channel number to obtain a left feature mapping and a right feature mapping each having a first channel number.

For example, the first channel number may be C/4 or the like. Specifically, a common convolutional layer structure may be used, and the left feature mapping and the right feature mapping of which the original channel number is C are reduced to C/4 respectively. A convolution layer of channel dimension reduction may adopt some common dimension reduction convolution structures, which are not specified herein.

S122, moving the right feature mapping having the first channel number in a horizontal direction according to a pixel step, and performing channel dimension splicing on the right feature mapping having the first channel number and the left feature mapping having the first channel number to obtain a disparity feature mapping having a second channel number.

The feature mapping after dimension reduction is subjected to a splicing operation in the channel dimension, thereby obtaining the disparity feature mapping having the second channel number. It should be understood that the left and right images are already on the same horizontal line through previous pre-processing operations such as epipolar alignment. When the left and right images are moved in the horizontal direction (i.e., a width W direction of the images), two identical objects with disparity are overlapped on the channel, so that different disparity can be artificially constructed.

As an example, the right feature mapping after dimension reduction may be moved in a horizontal direction at one pixel step each time, and for each pixel step moved, the disparity increases by one. After each pixel step is moved, the right feature mapping is spliced with the left feature mapping having the first channel number to obtain a splicing feature mapping having the second channel number under the corresponding disparity, and finally all the splicing feature mappings are combined to obtain the above disparity feature mapping. It should be understood that the second channel number is equal to the sum of two first channel numbers. Still taking the above C/4 as an example, the second channel number is C/2.

S123, performing channel dimension splicing on the left feature mapping and the right feature mapping each having the first channel number and the disparity feature mapping having the second channel number to obtain a disparity feature mapping having the original channel number.

The left and right feature mappings and disparity feature mapping after dimension reduction are spliced again, that is, the final splicing is performed to obtain a disparity feature mapping having a channel number still being C.

S124, performing channel dimension reduction on the disparity feature mapping having the original channel number to obtain a disparity feature mapping having a channel number of 1 to serve as the disparity cost volume with the reduced dimension.

In order to construct a cost volume, original left and right feature mappings are divided into a plurality of groups along the channel dimension in the embodiments of the present disclosure, and then an ith left feature mapping group and a corresponding ith right feature mapping group are cross-correlated on all disparity levels, thereby obtaining an inter-group correlation graph, that is, providing a better similarity measure of the left and right images by using the group-wise correlation.

Specifically, the left and right feature mappings having the original channel number are subjected to group-wise correlation calculation to obtain a group-wise correlation feature mapping. Then, convolution processing is performed on the left and right feature mappings having the first channel number and group-wise correlation feature mapping to obtain the disparity feature mapping having a channel number of 1.

As an example, the disparity cost volume may be represented by the following expression:

$$C(d, x, y) = Convs_1^c\left(f_l\left(\frac{c}{4}, x, y\right), f_r\left(\frac{c}{4}, x-d, y\right), Gwc\right),$$

$$Gwc(g, d, x, y) = \frac{1}{N_c/N_g}\langle f_l^g(x, y), f_r^g(x-d, y)\rangle,$$

in the formula, C (d, x, y) represents a disparity cost volume, $$Convs_1^c$$

represents a convolution operation, c is a total number of channels, $$f_l\left(\frac{c}{4}, x, y\right), f_r\left(\frac{c}{4}, x-d, y\right)$$

respectively represent a left feature mapping and a right feature mapping each having the channel number of C/4, (x, y) represents coordinates of pixel points in the left image, (x-d, y) represents the coordinates of pixel points in the right image whose disparity is d, Gwc represents group-wise correlation calculation, Nc/Ng represents the number of channels of each feature mapping group, where Ng is a divided group number, $$f_l^g(x, y), f_r^g(x-d, y)$$

respectively represent a left feature mapping group and a right feature mapping group obtained by dividing left and right feature mappings having the channel number of c into G groups, respectively.

It should be understood that a cost space having a channel number of C=1, a disparity number D, and a total dimension of [B, 1, D, H, W] may be constructed by means of the above convolution and dimension reduction. Since C=1, the total dimension of the cost volume may be considered as only [B, D, H, W], that is, the memory occupation is reduced by 1/C in the channel dimension. In addition, when constructing the cost space, the embedded device utilizes the append operation supported by itself to continuously increase the new space only in the disparity dimension.

S130, performing attention feature learning on the disparity cost volume to obtain an attention feature vector, and performing feature weighting on the disparity cost volume by using the attention feature vector to obtain a weighted cost volume.

In some embodiments, after the disparity cost volume is constructed, the attention mechanism is combined to improve the subsequent matching precision. As an example, attention feature extraction is performed on the disparity cost volume by using a trained convolutional network to obtain the attention feature vector, and then feature weighting is performed on the disparity cost volume through the attention feature vector to obtain an improved disparity cost volume.

Feature weighting is performed on the disparity cost volume through the attention feature vector, i.e., the disparity cost volume and the attention feature vector are subjected to inner product operation, which is specifically expressed as: $C'_{cost}=C_{cost}*W_{attention}$. In the formula, $C'_{cost}$ represents the weighted disparity cost volume, $C_{cost}$ represents the disparity cost volume before weighted, and $W_{attention}$ represents the attention feature vector. Since the channel number of the cost volume is reduced to 1, the dimension of the attention feature vector is [B, D, H, W].

The training for the trained convolutional network may adopt a common network model training process, for example, a Smooth L1 loss function is used to calculate a loss when a constructed convolutional network performs attention feature learning on training samples for iteratively updating parameters in the convolutional, until an attention feature vector output by the convolutional network after parameter updating meets a preset convergence condition, and then the training is stopped. For example, the preset convergence condition may be that an error between a supervision signal for supervising the learning and an attention feature vector output by the convolutional network from learning does not exceed an allowable error range, etc., and certainly may also be other conditions, which is not limited herein.

S140, performing disparity regression on the weighted cost volume based on a two-dimensional convolution to obtain a prediction disparity map.

After obtaining the disparity cost volume weighted by the attention feature vector, disparity regression is performed on the disparity cost volume to obtain a disparity map. It should be noted that since the disparity cost volume is reduced to 1 in the channel dimension, only the two-dimensional convolutional network may be used to extract the disparity feature during performing the disparity regression. Compared with the conventional solution relying on a three-dimensional convolutional network, the calculation amount herein is significantly reduced. In addition, since most of existing model files of the three-dimensional convolutional network are written in formats such as Python, the embedded device cannot support format conversion of these complex model files, that is, these model files cannot be directly transferred. However, in the embodiments of the present disclosure, since the complexity of the convolutional network is reduced to two dimensions, the model file of the two-dimensional convolutional network can be converted from Python format to onnx format and then be converted through a development tool SDK of the embedded device into the format supported by the embedded device, so as to realize the use of the model file on the embedded device.

As an example, disparity feature extraction is performed on the weighted cost volume by using a trained two-dimensional convolutional network, a normalized exponential function (i.e., a softmax function) is used to perform regularization processing on the disparity feature, so as to obtain probabilities of each pixel at different disparity levels, and then weighting and calculation are performed according to the probabilities and indexes corresponding to the disparity levels to obtain a disparity prediction value of each pixel, thereby generating a continuous prediction disparity map. It should be understood that the calculation of the disparity is a non-differentiable problem, so that a differentiable softargmin method is used in the embodiments of the present disclosure to regress from the disparity cost volume to obtain the disparity value of the pixel.

Specifically, the calculation of the prediction disparity is described by the following expression:

$$\overline{d} = \sum_{d=0}^{D_{max}} d \times \frac{-C_d}{\sum_j C_j},$$

in the formula, $\overline{d}$ represents a disparity prediction value of a single pixel, and Dmax represents a total number of disparities, and $$\frac{-C_d}{\sum_j C_j}$$

represents a probability that a current disparity level d is in all possible disparities $\Sigma_i C_j$.

In some embodiments, in the training process of the two-dimensional convolutional network, disparity prediction learning is performed on the cost volume through the two-dimensional convolutional network to obtain a prediction disparity map, and a loss value between the prediction disparity map and a real disparity map is calculated by using a Smooth L1 loss function to update the parameters of the two-dimensional convolutional network until a final output disparity prediction result can meet corresponding precision requirements.

Specifically, the loss function L may be described as:

$$L(g, \overline{d}) = \frac{1}{N}\sum_{i=1}^{N} \text{Smooth}_{L_1}(g_i - \overline{d}_i),$$

in the formula, gi represents an ith real disparity map, $\overline{d}_i$ represents an ith prediction disparity map, N is a total number of pixels, and Smooth L1 represents normalization processing on objects in parentheses.

S150, performing disparity depth conversion on the predicted disparity map to obtain a depth map of the binocular images.

For example, when disparity depth conversion is performed, the prediction disparity map is converted between the camera plane and the real world based on focal lengths and baseline distances of binocular cameras to obtain a depth map corresponding to the binocular images in the real world.

With reference to FIG. 4, it is assumed that P is a point in the real world, f is the focal length of the camera, and OLOR is a baseline of the plane where the camera is located, b is a baseline distance, and Z is a depth distance from P to the baseline, and then:

$$Z = \frac{b*f}{X_L - X_R} = \frac{b*f}{d},$$

where XL and XR respectively represent linear distances between projections PL and PR of the P point on planes of left and right cameras and a left plane of the camera, so that depth information Z in the real world is obtained through conversion.

According to the method for binocular depth estimation provided in the embodiments of the present disclosure, the obtained binocular images are preprocessed, feature extraction is performed on the obtained binocular images, and dimension reduction processing is adopted when the disparity cost volume is constructed, so that the cost volume is changed into 1 in the channel dimension, and finally, the two-dimensional convolution model is adopted to realize disparity prediction in the subsequent disparity regression process, so that the calculation amount of the model is small, the occupied memory is small, and the above operations can be supported by the embedded device. Therefore, the method realizes real-time operation on the embedded platform with low computing power, and the problem that the existing scheme cannot be carried out in the embedded device is effectively solved.

Figure 7:
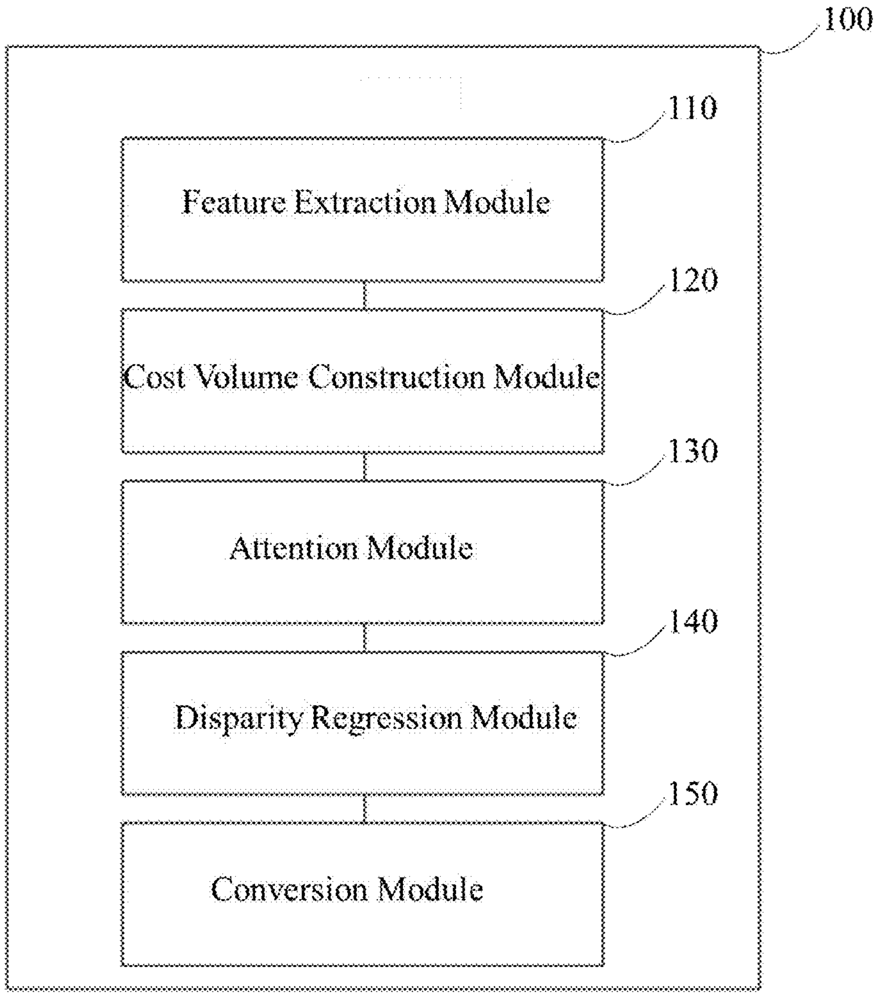
FIG. 7 is a schematic structural diagram of an apparatus for binocular depth estimation according to an embodiment of the present disclosure.

FIG. 7 is a schematic structural diagram of an apparatus 100 for binocular depth estimation according to an embodiment of the present disclosure. In some embodiments, the apparatus 100 includes: a feature extraction module 110, configured to obtain binocular images and perform feature extraction on the binocular images to obtain left and right feature mappings; a cost volume construction module 120, configured to perform disparity construction by using the left and right feature mappings to obtain a disparity cost volume with a reduced dimension; an attention module 130, configured to perform attention feature learning on the disparity cost volume to obtain an attention feature vector, and perform feature weighting on the disparity cost volume by using the attention feature vector to obtain a weighted cost volume; a disparity regression module 140, configured to perform disparity regression on the weighted cost volume based on a two-dimensional convolution to obtain a prediction disparity map; and a conversion module 150, configured to disparity depth conversion on the predicted disparity map to obtain a depth map of the binocular images.

It should be understood that the apparatus for binocular depth estimation in the embodiments of the present disclosure corresponds to the method for binocular depth estimation in the above embodiments, and the options related to the method in the above embodiments are also applicable to the apparatus embodiments, so that the description is not repeated herein.

The present disclosure further provides an embedded device, for example, the embedded device may be, but is not limited to, a terminal device built based on an embedded platform, such as an intelligent robot equipped with binocular cameras, a communication terminal, a monitoring device, etc., which is not limited herein.

As an example, the embedded device includes binocular cameras, a processor and a memory. The binocular cameras are configured for obtaining binocular images, the memory stores a computer program, and the processor executes the computer program to enable the embedded device to perform the method for binocular depth estimation or functions of the modules in the apparatus for binocular depth estimation.

The processor may be an integrated circuit chip having a signal processing capability. The processor may be a general-purpose processor, including at least one of a central processing unit (CPU), a graphics processing unit (GPU), and a network processor (NP), a digital signal processor (DSP), an application specific integrated circuit (ASIC), a field programmable gate array (FPGA), other programmable logic devices, discrete gates or transistor logic devices, and discrete hardware components. The general-purpose processor may be a microprocessor or the processor may be any conventional processor or the like, which is able to implement or perform methods, steps, and logical block diagrams disclosed in the embodiments of the present disclosure.

The memory may be, but is not limited to, a random access memory (RAM), a read-only memory (ROM), a programmable read-only memory (PROM), an erasable programmable read-only memory (EPROM), an electrically erasable programmable read-only memory (EEPROM), etc. The memory is configured to store the computer program, and the processor correspondingly executes the computer program after receiving an execution instruction.

The present disclosure further provides a non-transitory readable storage medium, configured to store the computer program used in the embedded device.

In the several embodiments provided in the present disclosure, it should be understood that the disclosed apparatus/device and method may also be implemented in other manners. The apparatus/device embodiments described above are merely illustrative, for example, the flowcharts and structural diagrams in the drawings illustrate the architecture, functionality, and operation of possible implementations of apparatuses, methods, and computer program products according to various embodiments of the present disclosure. In this regard, each block in the flowchart or block diagrams may represent a module, segment, or portion of code that includes one or more executable instructions for implementing specified logical functions. It should also be noted that, in an alternative implementation, the functions noted in the block may occur out of the order noted in the accompanying drawings. For example, two blocks shown in succession may, in fact, be executed substantially in parallel, which may sometimes be executed in a reverse order, depending upon the functions involved. It should also be noted that each block in the structural diagrams and/or flowchart, and combinations of blocks in the structural diagrams and/or flowchart, may be implemented with dedicated hardware-based systems that perform specified functions or acts, or may be implemented in combinations of special purpose hardware and computer instructions.

In addition, the functional modules or units in the embodiments of the present disclosure may be integrated together to form an independent portion, or each of the modules may exist alone, or two or more modules may be integrated to form an independent portion.

When the functions are implemented in the form of a software functional module and sold or used as an independent product, the functions may be stored in a non-transitory computer-readable storage medium. Based on such understanding, the technical solutions of the present disclosure may be embodied in the form of a software product in essence, or the part that contributes to the prior art or a portion of the technical solution may be embodied in the form of a software product. The computer software product is stored in a non-transitory storage medium and includes several instructions for enabling a computer device (which may be a smart phone, a personal computer, a server, or a network device, etc.) to perform all or some of the processes in the methods described in the embodiments of the present disclosure. The above storage medium includes various media that can store program codes, such as a USB flash disk, a mobile hard disk, a read-only memory (ROM), a random access memory (RAM), a magnetic disk, or an optical disc.

The above embodiments are merely intended for describing technical solutions of the present disclosure. However, the protection scope of the present disclosure is not limited thereto, and any person skilled in the art could easily conceive changes or substitutions within the technical scope disclosed in the present disclosure, all of which should be covered within the protection scope of the present disclosure.

What is claimed is:

1. A computer-implemented method for binocular depth estimation, comprising:

providing an embedded device comprising a processor, a memory and a binocular camera, wherein the memory and the binocular camera are electrically coupled to the processor, and a model file of a trained two-dimensional convolutional network is stored in the memory, and wherein a format of the model file is converted into a preset format supported by the embedded device;

obtaining, through the binocular camera, binocular images, and performing, through the processor, feature extraction on the binocular images to obtain left and right feature mappings;

performing, through the processor, disparity construction by using the left and right feature mappings to obtain a disparity cost volume with a reduced dimension;

performing, through the processor, attention feature learning on the disparity cost volume to obtain an attention feature vector, and performing feature weighting on the disparity cost volume by using the attention feature vector to obtain a weighted cost volume;

performing, through the processor, disparity regression on the weighted cost volume based on the trained two-dimensional convolutional network to obtain a prediction disparity map; and performing, through the processor, disparity depth conversion on the predicted disparity map to obtain a depth map of the binocular images, and storing the obtained depth map in the memory;

wherein performing, through the processor, the disparity construction by using the left and right feature mappings to obtain the disparity cost volume with the reduced dimension comprises:

performing, through the processor, channel dimension reduction on a left feature mapping and a right feature mapping each having an original channel number to obtain a left feature mapping and a right feature mapping each having a first channel number;

moving, through the processor, the right feature mapping having the first channel number in a horizontal direction according to a pixel step, and performing channel dimension splicing on the right feature mapping having the first channel number and the left feature mapping having the first channel number to obtain a disparity feature mapping having a second channel number;

performing, through the processor, channel dimension splicing on the left feature mapping and the right feature mapping each having the first channel number and the disparity feature mapping having the second channel number to obtain a disparity feature mapping having the original channel number; and performing, through the processor, channel dimension reduction on the disparity feature mapping having the original channel number to obtain a disparity feature mapping having a channel number of 1 to serve as the disparity cost volume with the reduced dimension.

2. The method according to claim 1, wherein performing, through the processor, the channel dimension reduction on the disparity feature mapping having the original channel number to obtain the disparity feature mapping having the channel number of 1 comprises:

performing, through the processor, group-wise correlation calculation on the left feature mapping and the right feature mapping each having the original channel number to obtain a group-wise correlation feature mapping; and performing, through the processor, convolution processing on the left feature mapping and the right feature mapping each having the first channel number and the group-wise correlation feature mapping to obtain the disparity feature mapping having the channel dimension of 1.

3. The method according to claim 1, wherein performing, through the processor, the attention feature learning on the disparity cost volume to obtain the attention feature vector comprises:

performing, through the processor, attention feature extraction on the disparity cost volume by using a trained convolutional network to obtain the attention feature vector, wherein the trained convolutional network is obtained by:

calculating, through the processor, a loss of attention feature learning on training samples by a constructed convolutional network using a smooth L1 loss function, to iteratively update parameters in the constructed convolutional network until an attention feature vector output by the constructed convolutional network in which the parameters have been updated meets a preset convergence condition.

4. The method according to claim 1, wherein performing, through the processor, the disparity regression on the weighted cost volume based on the trained two-dimensional convolutional network to obtain the prediction disparity map comprises:

performing, through the processor, disparity feature extraction on the weighted cost volume by using the trained two-dimensional convolutional network, performing regularization processing on disparity features by using a normalized exponential function to obtain probabilities of each pixel at different disparity levels, and performing weighting and calculation according to the probabilities and indexes corresponding to the disparity levels to obtain a disparity prediction value of each pixel, so as to generate a continuous prediction disparity map;

wherein, in a training process of the trained two-dimensional convolutional network, disparity prediction learning is performed on a cost volume through a two-dimensional convolutional network to obtain a prediction disparity map, and a loss value between the prediction disparity map and a real disparity map is calculated by using a smooth L1 loss function to update parameters in the two-dimensional convolutional network.

5. The method according to claim 1, wherein performing, through the processor, the disparity depth conversion on the prediction disparity map to obtain the depth map of the binocular images comprises:

converting, through the processor, the prediction disparity map between a camera plane and a real world based on a focal length and a baseline distance of a binocular camera to obtain the depth map of the binocular images in the real world.

6. The method according to claim 1, wherein before performing the feature extraction on the binocular images, the method further comprises:

preprocessing, through the processor, the binocular images that are obtained, wherein the binocular images that are preprocessed are used for the feature extraction, and wherein the preprocessing includes performing epipolar alignment on the binocular images, and performing pixel normalization processing on the binocular images that are aligned.

7. An embedded device comprising a binocular camera, a processor and a memory, wherein the binocular camera is configured to obtain binocular images, the memory stores a computer program and a model file of a trained two-dimensional convolutional network, a format of the model file is converted into a preset format supported by the embedded device, and the processor is configured to execute the computer program to perform a method for binocular depth estimation; and wherein the method includes:

obtaining binocular images through the binocular camera, and performing feature extraction on the binocular images to obtain left and right feature mappings;

performing disparity construction by using the left and right feature mappings to obtain a disparity cost volume with a reduced dimension;

performing attention feature learning on the disparity cost volume to obtain an attention feature vector, and performing feature weighting on the disparity cost volume by using the attention feature vector to obtain a weighted cost volume;

performing disparity regression on the weighted cost volume based on the trained two-dimensional convolutional network to obtain a prediction disparity map; and performing disparity depth conversion on the prediction disparity map to obtain a depth map of the binocular images, and storing the obtained depth map in the memory;

wherein performing the disparity regression on the weighted cost volume based on the trained two-dimensional convolutional network to obtain the prediction disparity map includes:

performing disparity feature extraction on the weighted cost volume by using the trained two-dimensional convolutional network, performing regularization processing on disparity features by using a normalized exponential function to obtain probabilities of each pixel at different disparity levels, and performing weighting and calculation according to the probabilities and indexes corresponding to the disparity levels to obtain a disparity prediction value of each pixel, so as to generate a continuous prediction disparity map;

wherein, in a training process of the trained two-dimensional convolutional network, disparity prediction learning is performed on a cost volume through a two-dimensional convolutional network to obtain a prediction disparity map, and a loss value between the prediction disparity map and a real disparity map is calculated by using a smooth L1 loss function to update parameters in the two-dimensional convolutional network.

8. The embedded device according to claim 7, wherein the performing disparity construction by using the left and right feature mappings to obtain the disparity cost volume with the reduced dimension includes:

performing channel dimension reduction on a left feature mapping and a right feature mapping each having an original channel number to obtain a left feature mapping and a right feature mapping each having a first channel number;

moving the right feature mapping having the first channel number in a horizontal direction according to a pixel step, and performing channel dimension splicing on the right feature mapping having the first channel number and the left feature mapping having the first channel number to obtain a disparity feature mapping having a second channel number;

performing channel dimension splicing on the left feature mapping and the right feature mapping each having the first channel number and the disparity feature mapping having the second channel number to obtain a disparity feature mapping having the original channel number; and performing channel dimension reduction on the disparity feature mapping having the original channel number to obtain a disparity feature mapping having a channel number of 1 to serve as the disparity cost volume with the reduced dimension.

9. The embedded device according to claim 8, wherein the performing channel dimension reduction on the disparity feature mapping having the original channel number to obtain the disparity feature mapping having the channel number of 1 includes:

performing group-wise correlation calculation on the left feature mapping and the right feature mapping each having the original channel number to obtain a group-wise correlation feature mapping; and performing convolution processing on the left feature mapping and the right feature mapping each having the first channel number and the group-wise correlation feature mapping to obtain the disparity feature mapping having the channel number of 1.

10. The embedded device according to claim 7, wherein the performing attention feature learning on the disparity cost volume to obtain the attention feature vector includes:

performing attention feature extraction on the disparity cost volume by using a trained convolutional network to obtain the attention feature vector, wherein the trained convolutional network is obtained by:

calculating a loss of attention feature learning on training samples by a constructed convolutional network using a smooth L1 loss function, to iteratively update parameters in the constructed convolutional network until an attention feature vector output by the constructed convolutional network in which the parameters have been updated meets a preset convergence condition.

11. The embedded device according to claim 7, wherein the performing disparity depth conversion on the prediction disparity map to obtain the depth map of the binocular images includes:

converting the prediction disparity map between a camera plane and a real world based on a focal length and a baseline distance of a binocular camera to obtain the depth map of the binocular images in the real world.

12. The embedded device according to claim 7, wherein before performing the feature extraction on the binocular images, the method further includes:

preprocessing the binocular images that are obtained, wherein the binocular images that are preprocessed are used for the feature extraction, and wherein the preprocessing includes performing epipolar alignment on the binocular images, and performing pixel normalization processing on the binocular images that are aligned.

13. The method according to claim 1, wherein the method further comprises:

converting, through the processor, the format of the model file into the preset format.

* * * * *